US 8,516,128 B2

(12) United States Patent
Thywissen et al.

(10) Patent No.: US 8,516,128 B2
(45) Date of Patent: Aug. 20, 2013

(54) HANDLING OF A COMMUNICATION SESSION

(75) Inventors: Kurt Thywissen, Los Gatos, CA (US); Tyler Wells, Los Gatos, CA (US)

(73) Assignee: Microsoft Corporation, Redmond, WA (US)

( * ) Notice: Subject to any disclaimer, the term of this patent is extended or adjusted under 35 U.S.C. 154(b) by 530 days.

(21) Appl. No.: 12/821,776

(22) Filed: Jun. 23, 2010

(65) Prior Publication Data

US 2011/0320609 A1 Dec. 29, 2011

(51) Int. Cl.
*G06F 15/16* (2006.01)

(52) U.S. Cl.
USPC .......................................... 709/227

(58) Field of Classification Search
USPC ................. 709/201–203, 221, 227, 229
See application file for complete search history.

(56) References Cited

U.S. PATENT DOCUMENTS

| | | | | |
|---|---|---|---|---|
| 5,721,817 | A * | 2/1998 | Kurihara et al. | 709/227 |
| 6,199,110 | B1 * | 3/2001 | Rizvi et al. | 709/227 |
| 6,546,425 | B1 * | 4/2003 | Hanson et al. | 709/227 |
| 6,608,637 | B1 * | 8/2003 | Beaton et al. | 715/762 |
| 6,728,747 | B1 * | 4/2004 | Jenkins et al. | 718/101 |
| 6,753,884 | B1 * | 6/2004 | Finch et al. | 715/762 |
| 6,981,047 | B2 * | 12/2005 | Hanson et al. | 709/227 |
| 7,120,672 | B1 * | 10/2006 | Szeto et al. | 709/206 |
| 7,203,755 | B2 * | 4/2007 | Zhu et al. | 709/227 |
| 8,060,656 | B2 * | 11/2011 | Hanson et al. | 709/250 |
| 8,078,727 | B2 * | 12/2011 | Hanson et al. | 709/226 |
| 8,285,785 | B2 * | 10/2012 | Ekholm et al. | 709/204 |
| 8,359,392 | B2 * | 1/2013 | Garbajs et al. | 709/227 |
| 2002/0130904 | A1 * | 9/2002 | Becker et al. | 345/753 |
| 2003/0040340 | A1 * | 2/2003 | Smethers | 455/566 |
| 2003/0206192 | A1 * | 11/2003 | Chen et al. | 345/733 |
| 2004/0260753 | A1 * | 12/2004 | Regan | 709/200 |
| 2005/0120024 | A1 | 6/2005 | Tharpe, Jr. et al. | |
| 2006/0123079 | A1 * | 6/2006 | Sturniolo et al. | 709/203 |
| 2006/0179224 | A1 * | 8/2006 | Boyles et al. | 711/123 |
| 2007/0038759 | A1 * | 2/2007 | Hanson et al. | 709/227 |
| 2007/0136459 | A1 * | 6/2007 | Roche et al. | 709/224 |
| 2008/0298483 | A1 * | 12/2008 | Marchok et al. | 375/260 |

(Continued)

OTHER PUBLICATIONS

Notification of the Transmittal of the International Search Report and Written Opinion of the International Searching Authority, or the Declaration, PCT/EP2011/060423, Date of Mailing: Oct. 14, 2011, 12 pp.

(Continued)

*Primary Examiner* — Ario Etienne
*Assistant Examiner* — Sargon Nano
(74) *Attorney, Agent, or Firm* — Wolfe-SBMC

(57) ABSTRACT

Method, device and computer program product for handling a communication session at a device, by executing a communication session handling program at the device, the communication session handling program comprising a communication session handling part for handling the communication session and an interfacing part for linking with a communication session control interface. An application executed at the device provides, to a user of the device, a communication session control interface for the communication session handled by the communication session handling part of the communication session handling program, the application linking with the interfacing part of the communication session handling program. On detecting that the application has ceased to provide the communication session control interface, the interfacing part of the communication session handling program links, without dropping the communication session, to a further communication session control interface provided at the device for continuation of the communication session handled by the communication session handling part.

19 Claims, 3 Drawing Sheets

(56) References Cited

U.S. PATENT DOCUMENTS

| | | | |
|---|---|---|---|
| 2010/0241753 A1* | 9/2010 | Garbajs et al. | 709/227 |
| 2010/0257451 A1* | 10/2010 | Halevi et al. | 715/733 |
| 2011/0296312 A1* | 12/2011 | Boyer et al. | 715/736 |
| 2011/0314397 A1* | 12/2011 | Ogle et al. | 715/764 |
| 2011/0320553 A1* | 12/2011 | Wu et al. | 709/206 |

OTHER PUBLICATIONS

Thanh, Do V., et al., "Personalized IMS Client Widget", Intelligence in Next Generation Networks, 2009, ICIN 2009, 13th International Conference On, *IEEE*, Piscataway, NJ, USA (Oct. 26, 2009), 6 pages.

* cited by examiner

HANDLING OF A COMMUNICATION SESSION

TECHNICAL FIELD

This invention relates to handling a communication session at a device.

BACKGROUND

Packet-based communication systems allow a user of a device, such as a personal computer, to communicate across a computer network such as the Internet. Packet-based communication systems include voice over internet protocol ("VoIP") communication systems which can support calls, and other communication sessions, between users of the communication systems. These communication systems are beneficial to the user as they are often of significantly lower cost than fixed line or mobile networks. This may particularly be the case for long-distance communication. To use a VoIP system, client software must be installed and executed on the device. The client software provides the VoIP connections as well as other functions such as registration and authentication. A user of a packet-based communication system can establish calls with other users who are simultaneously logged in to the communication system.

Client software for VoIP communications can be provided by an application at a device, for example, client software may be provided in the form of a plug-in program which can be executed within a host application, such as a web browser at a device. The plug-in program can handle VoIP calls and use the host application for displaying a call control interface thereby allowing a user to set up and control VoIP calls through the host application. The use of such a plug-in program in a web browser (or other host application) facilitates the set up, and control, of VoIP calls for a user who is using the web browser. The use of a plug-in program is a particularly user friendly method for implementing the client software at the device.

SUMMARY

According to a first aspect of the present invention there is provided a method of handling a communication session at a device, the method comprising: executing a communication session handling program at the device, the communication session handling program comprising a communication session handling part for handling the communication session and an interfacing part for linking with a communication session control interface; executing an application at the device, the application providing, to a user of the device, a communication session control interface for the communication session handled by the communication session handling part of the communication session handling program, the application linking with the interfacing part of the communication session handling program; detecting that the application has ceased to provide the communication session control interface; and on detecting that the application has ceased to provide the communication session control interface, linking the interfacing part of the communication session handling program, without dropping the communication session, to a further communication session control interface provided at the device for continuation of the communication session handled by the communication session handling part of the communication session handling program.

According to a second aspect of the present invention there is provided a device for handling a communication session, the device comprising: means for executing a communication session handling program at the device, the communication session handling program comprising a communication session handling part for handling the communication session and an interfacing part for linking with a communication session control interface; and means for executing an application at the device, the application providing, to a user of the device, a communication session control interface for the communication session handled by the communication session handling part of the communication session handling program, the application linking with the interfacing part of the communication session handling program; means for detecting that the application has ceased to provide the communication session control interface, wherein on detecting that the application has ceased to provide the communication session control interface, the interfacing part of the call handling program links, without dropping the call, to a further communication session control interface provided at the device for continuation of the communication session handled by the communication session handling part of the communication session handling program.

According to a third aspect of the present invention there is provided a computer program product comprising computer readable instructions for execution by computer processing means at a device for handling a communication session at the device, the instructions comprising instructions for: executing a communication session handling program at the device, the communication session handling program comprising a communication session handling part for handling the communication session and an interfacing part for linking with a communication session control interface; and executing an application at the device, the application providing, to a user of the device, a communication session control interface for the communication session handled by the communication session handling part of the communication session handling program, the application linking with the interfacing part of the communication session handling program; detecting that the application has ceased to provide the communication session control interface; and on detecting that the application has ceased to provide the communication session control interface, linking the interfacing part of the communication session handling program, without dropping the communication session, to a further communication session control interface provided at the device for continuation of the communication session handled by the communication session handling part of the communication session handling program.

The application may comprise a host application hosting a plug-in program. The plug-in program may provide the communication session control interface, A further program, other than the plug-in program, may provide the further communication session control interface. The application may link with the interfacing part of the communication session handling program by means of the plug-in program. The plug-in program may comprise a HyperText Markup Language tag. The communication session may comprise for example a voice call, a video call, a chat session, a voice mail or a video mail.

The application may be a web browser. The application may cease to provide the communication session control interface when the application is closed. Where the application is a web browser hosting a plug-in program, the web browser may host the plug-in program on a web page and the web browser may cease to host the plug-in program when the user navigates away from the web page, thereby ceasing to provide the communication session control interface.

Embodiments of the invention are particularly useful when a user unintentionally causes the application to cease to provide the communication session control interface, since the communication session is continued in a further communication session control interface without dropping the communication session. For example, when the application is a web browser providing the communication session control interface in a web page (e.g. using a plug-in program) a user may close the web page (e.g. by closing a tab) or navigate away from the web page without meaning to end the communication session. If this happens the communication session can be continued using a further communication session control interface without dropping the communication session.

The inventors have realized that in prior art systems in which an application provides a control interface for a call (or other type of communication session), when the application is closed (or ceases to provide the control interface for some other reason) the call will be dropped. For example, where the application comprises a web browser hosting a plug-in program which handles VoIP calls, when the web browser ceases to host the plug-in program any VoIP calls being handled by the plug-in program will be dropped. This drawback with the prior art systems is overcome by providing the communication session handling program described herein which can handle communication sessions independently of the application (e.g. the web browser). This allows the user to navigate to another web page or to close the web browser without terminating a communication session being handled by the communication session handling program. This is achieved by providing the communication session handling program with an interfacing part which can link with the application to thereby provide the communication session control interface to the user.

Terminating the communication session control interface provided by the application does not prevent the communication session from continuing because the communication session handling program handles the communication session independently of the application. A further communication session control interface is used for continuation of the communication session. Therefore where the application is a web browser the user is free to navigate to another web page without dropping a call and video can be seamlessly output to a different window, which provides a further communication session control interface. The further communication session control interface may be provided in a new window that is opened when the application ceases to provide the communication session control interface. Alternatively, the further communication session control interface may be provided in a program that is already being executed at the device when the host application ceases to provide the communication session control interface.

Where the application is a host application hosting a plug-in program, preferably the communication session handling program is separate to the plug-in program. The communication session handling program and the plug-in program are installed on the device. The communication session handling program preferably handles the communication session set up and may encode and decode data, or "media", for use in the communication session. A plug-in program may be used to provide a communication session control interface for the communication session to the user and may also display video in the case that the communication session is a video call. In the event that a host application hosting the plug-in program is closed, the communication session is not dropped since the communication session is handled independently by the communication session handling program.

In a preferred embodiment of the invention the communication session handling program is arranged to cause a new window to be opened if the application ceases to provide the communication session control interface, the new window being used to provide a further communication session control interface to the user for the communication session.

Different terminology for the programs referred to herein may be used in the art. For example, the communication session handling program may be referred to as a "runtime" and the plug-in program may be referred to as a "plug-in", "plugin or "plug in".

BRIEF DESCRIPTION OF THE DRAWINGS

For a better understanding of the present invention and to show how the same may be put into effect, reference will now be made, by way of example, to the following drawings in which.

DETAILED DESCRIPTION

Figure 1:
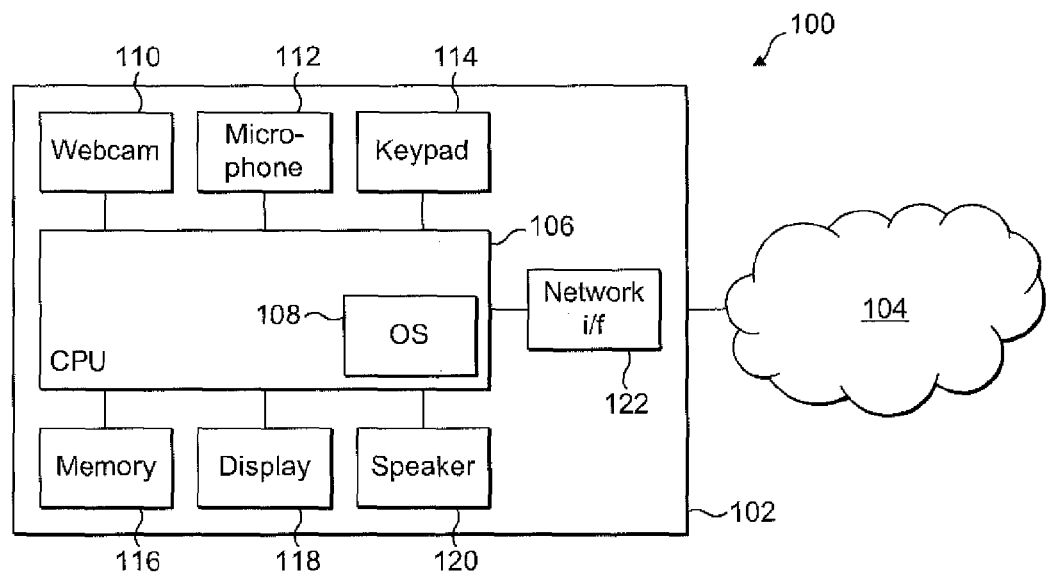
FIG. 1 is a schematic diagram of a communication system according to a preferred embodiment.

In general the methods described herein can be applied to any type of communication session, e.g. voice call, video call, chat session, voice mail or video mail. However, in the preferred embodiments described in detail below the communication session is a call. Reference is first made to FIG. 1, which illustrates a communication system 100. Note that whilst this illustrative embodiment is described with reference to a P2P communication system, other types of communication system could also be used, such as non-P2P systems. The communication system 100 comprises a device 102, which is connected to a network 104. The network 104 may be for example the Internet. The device 102 may be, for example, a mobile phone, a personal digital assistant ("PDA"), a personal computer ("PC") (including, for example, Windows™, Mac OS™ and Linux™ PCs), a gaming device or other embedded device able to connect to the network 104. The device 102 is arranged to receive information from and output information to a user of the device 102. Note that in alternative embodiments, the device 102 can connect to the communication network 104 via additional intermediate networks not shown in FIG. 1. For example, if the device 102 is a mobile device, then it can connect to the communication network 104 via a cellular mobile network (not shown).

The device 102 comprises a central processing unit ("CPU") 106, to which is connected a display 118 such as a screen, input devices such as a keypad (or a keyboard) 114, a pointing device such as a joystick (not shown), a microphone 112 for the input of audio signals and a webcam 110 for the input of video signals. The display 118 may comprise a touch screen for inputting data to the CPU 106. An output audio device 120 (e.g. a speaker) is connected to the CPU 106. The display 118, keypad 114, joystick, speaker 120, microphone 112 and webcam 110 are integrated into the device 102. In alternative devices one or more of the display 118, the keypad 114, the joystick, the speaker 120, the microphone 112 and the webcam 110 may not be integrated into the device and may be connected to the CPU 106 via respective interfaces. One example of such an interface is a USB interface. A pointing device such as a mouse (not shown) may be connected to the CPU 106 via an interface (not shown). The CPU 106 is connected to a network interface 122 such as a modem for communication with the network 104. The network interface 122 may be integrated into the device 102 as shown in FIG. 1. In alternative devices the network interface 122 is not integrated into the device. The device 102 comprises a memory 116 for storing data. The memory 116 is configured such that data can be transferred between the CPU 106 and the memory 116 as is known in the art.

FIG. 1 also illustrates an operating system ("OS") 108 executed on the CPU 106. Computer programs can run on top of the operating system 108. In this way the CPU 106 can execute programs as is known in the art. For example client software can be executed by the CPU 106 thereby allowing the device 102 to engage in communications over the communication network 104.

Figure 2:
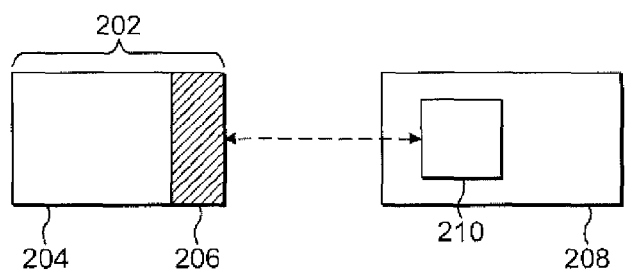
FIG. 2 is a schematic diagram of programs being executed in a device according to a preferred embodiment.

FIG. 2 is a representation of programs being executed by the CPU 106 in a preferred embodiment. A call handling program 202 is executed by the CPU 106. The call handling program 202 comprises a call handling part 204 which handles calls made over the communication network 104. The call handling part 204 is responsible for handling call set up, encoding and decoding audio and video signals for use in the call, and for handling other processes regarding the handling of the call, such as presence information of users in the communications system 100. The call handling program 202 also comprises an interfacing part 206 which is for linking the call handling program 202 with a call control interface. The call handling program 202 does not have a call control interface for interfacing with the user of the device 102, and so links to a call control interface using the interfacing part 206. Since the interfacing part 206 allows the call handling program 202 to link with an independent call control interface, if for some reason the call control interface ceases to be executed at the device 102 then the interfacing part 206 can link with a different call control interface and the call handled by the call handling part 204 is not dropped. This means that the call (handled by the call handling part 204) can continue despite a call control interface ceasing to be executed at the device 102.

FIG. 2 also shows a host application 208 which is executed by the CPU 106. The host application 208 hosts a plug-in program 210. The host application 208 is a web browser in the preferred embodiments described herein, but the host application could be a different application hosting the plug-in program 210. When the plug-in program 210 is executed in the host application 208 it provides, to the user of the device 102, a call control interface for the call handled by the call handling part 204 of the call handling program 202. Although in the preferred embodiment shown in FIG. 2 there is a host application 208 hosting a plug-in program 210, in alternative embodiments an application which is not a host application hosting a plug-in program may be used for providing the communication session control interface.

As shown in FIG. 2 by the dashed line, the interfacing part 206 of the call handling program 202 links with the plug-in program 210, such that the plug-in program 210 can provide the call control interface for the call handling program 202.

Figure 3:
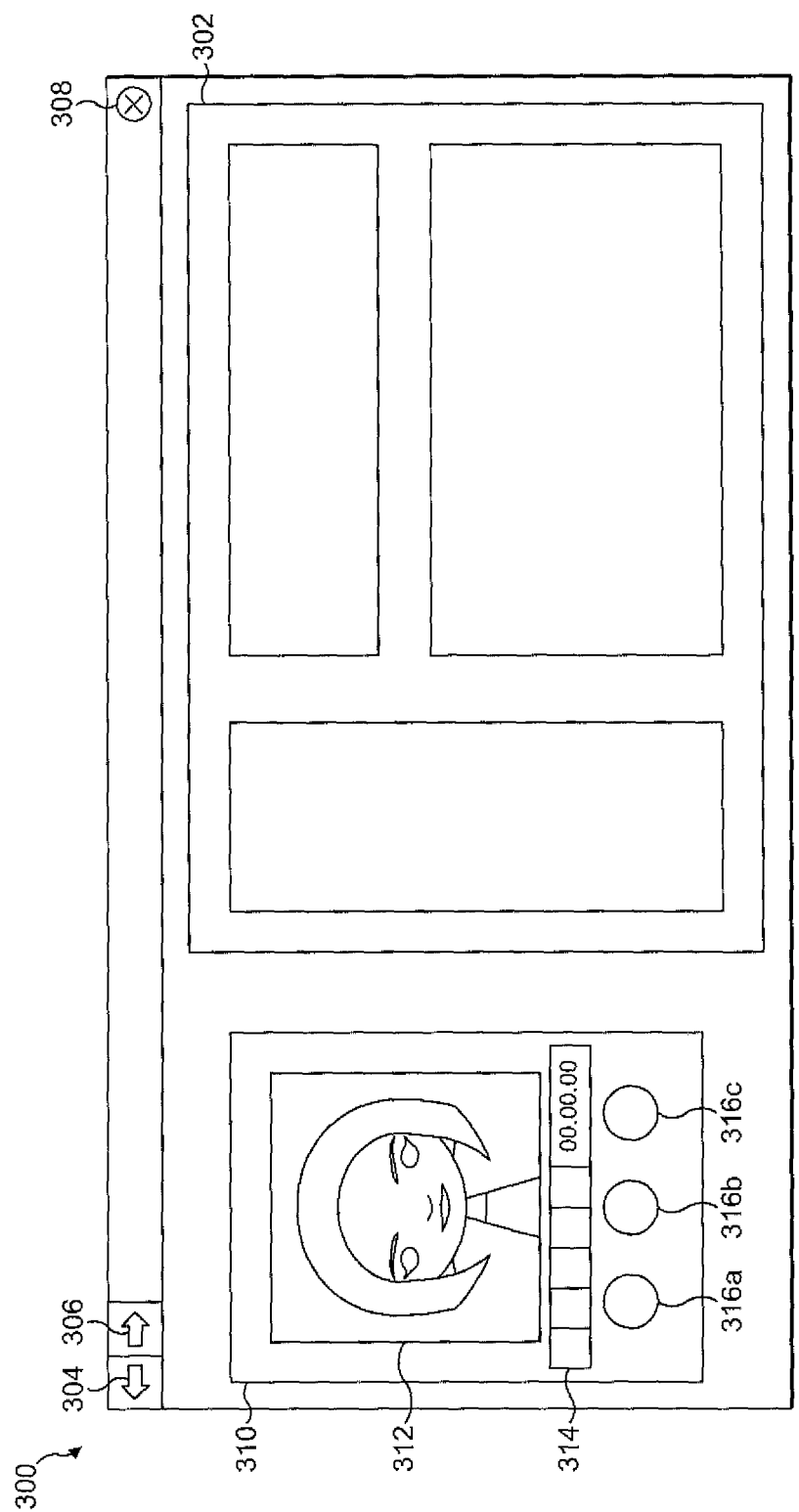
FIG. 3 is a representation of a user interface of a web browser hosting a plug-in program according to a preferred embodiment.

FIG. 3 is a representation of a user interface 300 displayed to the user of the device 102 when the web browser 208 is executed hosting the plug-in program 210. The user interface 300 comprises a section 302 which displays information relating to the web browser 208 itself. The information displayed to the user in section 302 is not related to the plug-in program 210 and the call handling program 202. Different types of information may be displayed in section 302 according to the type of web browser 208. Furthermore, for different web browsers, the information relating to the web browser 208 itself may be set out differently on the screen to that shown in the example user interface 300 of FIG. 3. The user interface 300 has controls for navigating to different web pages in the web browser 208. For example, as is known in the art, if the user clicks on the back button 304 then the web browser 208 will navigate to the previously displayed web page and if the user clicks on the forward button 306 then the web browser 208 will navigate to the next web page to be displayed. The plug-in program 210 might not be hosted on all web pages and so when the user navigates to a new web page in the web browser 208 the web browser 208 might cease to host the plug-in program 210. The plug-in program 210 may be hosted on some web pages but not on other web pages of the web browser 208. If the user clicks on the close button 308 then the web browser 208 is closed. This results in the web browser 208 ceasing to host the plug-in program 210.

The section 310 of the user interface 300 is used to display, to the user, the call control interface provided by the plug-in program 210. The section 310 includes a video pane 312 for displaying the video component of a video signal. Where a call being handled by the call handling program 202 is a video call the video part of the video call is displayed in the video pane 312. The call handling program 202 decodes a video signal received as part of the video call and provides the decoded video signal to the plug-in program 210 which then renders the video signal and displays the video in the video pane 312. The section 310 also includes controls 314 and buttons 316. The controls 314 and buttons 316 can be used by the user to control the call being handled by the call handling program 202, and in this sense the controls 314 and buttons 316 constitute a call control interface for the call handling program 202.

Figure 4:
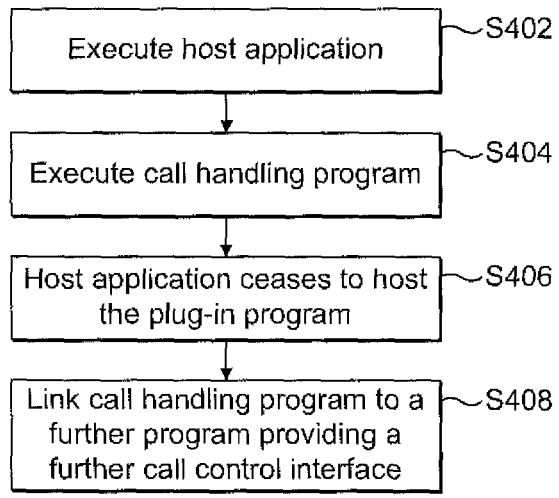
FIG. 4 shows a flowchart of a process for handling a call according to a preferred embodiment.

A method for handling a call according to a preferred embodiment will now be described by way of example with reference to FIG. 4. In step S402 the web page 208 (or other host application) is executed at the device 102. The web browser 208 hosts the plug-in program 210. A web page rendered by the web browser includes a HyperText Markup Language (HTML) tag, or an Extensible HyperText Markup Language (XHTML) tag, that instantiates the plug-in program 210. The plug-in program 210 causes the call handling program 202 to be executed at the device 102 if it is not already being executed. It is noted that more than one web page may instantiate a separate plug-in program and each plug-in program is assigned a unique ID.

In step S404 the call handling program 202 is executed at the device 102. The call handling program 202 may be caused to execute as a result of the execution of the plug-in program 210 in the web browser 208 as described above. Alternatively, the call handling program 202 may be caused to execute by means other than the execution of the web browser 208, for example by the user of the device 102 selecting to execute the call handling program 202. The call handling part 204 of the call handling program 202 handles a call that is occurring between the device 102 and another device over the network 104. The call handling program 202 maintains a list of plug-in program IDs that are being executed at the device 102. The call handling program 202 maintains a connection with each instance of a plug-in program being executed at the device 102 using the interfacing part 206 of the call handling program 202. If a host application ceases to host a particular plug-in program, (e.g. if the web browser 208 is closed, or the user navigates away from a web page in which the plug-in program is instantiated) then the particular plug-in program ID is deleted from the list.

Following steps S402 and S404 the call handling program 202 can handle a call over the network 104 and the plug-in program 210 can provide the call control interface to the user of the device 102 for controlling the call. As described above the call handling part 204 of the call handling program 202 handles call set up, and handles the encoding and decoding of audio and video data for use in the call. When the call is a video call, the call handling part 204 provides decoded video data to the plug-in program 210 which renders the video data in the web page of the web browser 208. The decoded audio signal is output from the call handling program 202 directly to the speakers 120 of the device 102. The call handling program 202 is responsive to user interface (UI) call control commands input via the plug-in program 210, such as commands to start a call and to end a call over the network 104.

In step S406 the web browser 208 ceases to host the plug-in program 210. As described above, this may be, for example, because the user navigates away from the web page in which the plug-in program 210 is instantiated or because the user closes the web browser 208. The interfacing part 206 of the call handling program 202 detects that the web browser 208 has ceased to host the plug-in program 210. The link between the interfacing part 206 of the call handling program 202 and the plug-in program 210 is broken when the plug-in program 210 ceases to be hosted by the host application 208. However, since the call handling program 202 is separate from the plug-in program 210, the call handling program 202 can continue to handle the call. This means that the call is not dropped as a result of the host application 208 ceasing to host the plug-in program 210. Indeed the call may remain active and the audio signal for the call may continue to be output via the speakers 120. Audio data captured by the microphone 112 and video data captured by the webcam 110 can continue to be transmitted to the far end of the call over the network 104.

When the host application 208 ceases to host the plug-in program 210 in step S406, the call control interface provided by the plug-in program 210 for the call being handled by the call handling program 202 stops being displayed to the user of the device 102. However, in step S408 on detecting that the host application 208 is no longer hosting the plug-in program 210 to thereby provide a call control interface, the interfacing part 206 of the call handling program 202 links to a further program executing at the device which provides a further call control interface for the call handled by the call handling part 204 of the call handling program 202. In some embodiments, instead of linking to a further program, the call handling program 202 links to a further instance of the same plug-in program 210 executing at the device 102.

The call handling program 202 determines whether a further suitable plug-in program is being executed at the device 102 for providing a call control interface for the call. If a further instance of a plug-in program (e.g. a further plug-in program) is executing at the device 102, then the interfacing part 206 will link to that further plug-in program. In this way the further plug-in program can be used to provide a further call control interface for the call being handled by the call handling program 202. In some embodiments the further program which provides the further communication session control interface is not a plug-in program hosted by a host application.

If no such suitable further plug-in program is executing at the device 102 when the host application ceases to host the plug-in program 210 then the call handling program is arranged to open a further program in a new window and to use that further program to provide a call control interface to the user for the call and where the call is a video call to render the received video data. The call handling program 202 can use the list that it maintains of plug-in IDs to determine whether there are any suitable plug-in programs being executed at the device 102 for use in providing the further call control interface for the call handling program 202. If the plug-in count in the list is zero when the host application 208 ceases to host the plug-in program 210 then the call handling program 202 opens the new window for the further program to provide the further call control interface.

In some embodiments the call handling program 202 is arranged to open a new window for the further program without first determining whether a further suitable plug-in program is being executed at the device 102.

Figure 5:
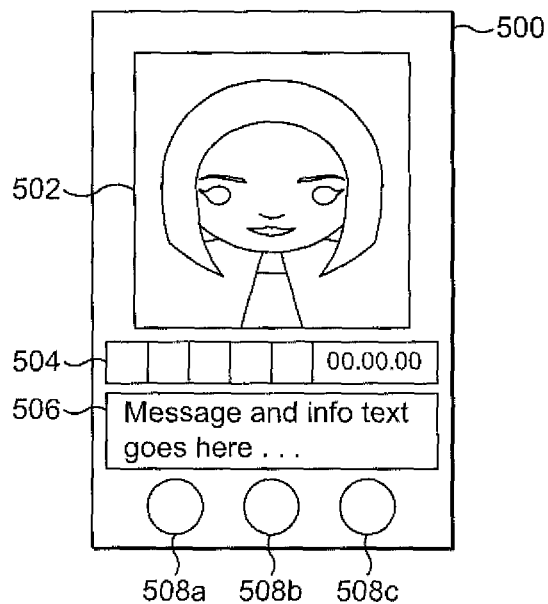
FIG. 5 is a representation of a window that is opened when the web browser is closed according to a preferred embodiment.

FIG. 5 is a representation of a window 500 that is opened when the web browser 208 ceases to host the plug-in program 210 according to a preferred embodiment. The window 500 displays, to the user, a further call control interface provided by a further program for use by the user in controlling the call being handled by the call handling program 202. The window 500 includes a video pane 502 for displaying the video component of a video signal. Where a call being handled by the call handling program 202 is a video call the video part of the video call is displayed in the video pane 502. The window 500 also includes controls 504, a text box 506 and buttons 508, which together constitute the further call control interface for the call handling program 202. The controls 504 and buttons 508 can be used by the user to control the call being handled by the call handling program 202, and the text box 506 can be used to display information to the user. The window 500 is a Desktop View window acting as a call control interface for the call handling program 202.

The sequence of events in a preferred embodiment is as follows. The user of the device 102 closes the web browser 208 or navigates away from the web page hosting the plug-in program 210. The link between the plug-in program 210 and the interfacing part 206 of the call handling program 202 is dropped. If the plug-in program count in the list maintained at the call handling program is zero, then the call handling program 202 opens a desktop view window. The new desktop view window links with the interfacing part 206 of the call handling program 202. The call control interface is then provided in the new desktop view window and where the call is a video call the video is rendered in the new desktop view window.

There has been described above a method of handling a call in which the call control interface is provided by a plug-in program 210 hosted by a host application 208. The plug-in program 210 links to the interfacing part 206 of the call handling program 202 which handles calls over the communication network 104. Providing the call control interface with a plug-in program has the advantage of facilitating use of the call handling program 202 for a user who is using the host application 208. Since the call handling program 202 handles the call independently of the host application 208, if the host application 208 ceases to host the plug-in program 210, the call is not dropped. A further program is executed at the device 102 to provide a further call control interface for the call which continues after the plug-in program 210 ceases to be hosted by the host application 208. This is possible because the interfacing part 206 of the call handling program 202 allows the call handling program 202 to link to different programs (or different instances of the same program) which can provide call control interfaces for the call handling program 202. The separation of the call control interface from the call handling program 202 allows the user to close the web browser hosting the plug-in program, or navigate away from the web page on which the plug-in program is hosted, whilst maintaining the call that is being handled by the call handling program 202.

While this invention has been particularly shown and described with reference to preferred embodiments, it will be understood to those skilled in the art that various changes in form and detail may be made without departing from the scope of the invention as defined by the appendant claims.

What is claimed is:

1. A method of handling a communication session at a device, the method comprising:
   executing a communication session handling program at the device, the communication session handling program comprising a communication session handling part for handling the communication session and an interfacing part for linking with a communication session control interface;
   executing an application at the device, the application providing, to a user of the device, a communication session control interface for the communication session handled by the communication session handling part of the communication session handling program, the application linking with the interfacing part of the communication session handling program;
   detecting that the application has ceased to provide the communication session control interface; and
   on detecting that the application has ceased to provide the communication session control interface, linking the interfacing part of the communication session handling program, without dropping the communication session, to a further communication session control interface provided at the device for continuation of the communication session handled by the communication session handling part of the communication session handling program.

2. The method of claim 1 wherein the application comprises a host application hosting a plug-in program.

3. The method of claim 2 wherein the plug-in program provides the communication session control interface.

4. The method of claim 3 wherein a further program provides the further communication session control interface.

5. The method of claim 2 wherein the application links with the interfacing part of the communication session handling program by means of the plug-in program.

6. The method of claim 2 wherein the plug-in program comprises a HyperText Markup Language tag.

7. The method of claim 1 wherein the application is a web browser.

8. The method of claim 7 wherein the web browser provides the communication session control interface on a web page and the web browser ceases to provide the communication session control interface when the user navigates away from the web page.

9. The method of claim 1 wherein the application ceases to provide the communication session control interface when the application is closed.

10. The method of claim 1 further comprising opening a new window on detecting that the application has ceased to provide the communication session control interface, the further communication session control interface being provided in the new window.

11. The method of claim 1 further comprising on detecting that the application has ceased to provide the communication session control interface, determining whether a further program for providing a communication session control interface is being executed at the device, wherein if it is determined that a further program for providing the communication session control interface is being executed at the device the method further comprises using the further program to provide the further communication session control interface for the communication session handled by the communication session handling part of the communication session handling program.

12. The method of claim 11 wherein a plurality of said further programs for providing a communication session control interface are capable of execution at the device and the method further comprises the communication session handling program maintaining a list of identifiers identifying which of the further programs are currently executing at the device, wherein the step of determining whether a further program is being executed at the device comprises determining whether an identifier identifying the further program is present in the list.

13. The method of claim 1 wherein the communication session comprises a voice call, a video call, a chat session, a voice mail or a video mail.

14. The method of claim 13 wherein the communication session is a video call and the method further comprises the application rendering the video call.

15. The method of claim 1 wherein the communication session handling part of the communication session handling program handles communication session set up.

16. The method of claim 1 wherein the communication session handling part of the communication session handling program encodes and decodes data for use in the communication session.

17. The method of claim 1 wherein the communication session uses Voice over Internet Protocol.

18. A device for handling a communication session, the device comprising:
    means for executing a communication session handling program at the device, the communication session handling program comprising a communication session handling part for handling the communication session and an interfacing part for linking with a communication session control interface; and
    means for executing an application at the device, the application providing, to a user of the device, a communication session control interface for the communication session handled by the communication session handling part of the communication session handling program, the application linking with the interfacing part of the communication session handling program;
    means for detecting that the application has ceased to provide the communication session control interface, wherein on detecting that the application has ceased to provide the communication session control interface, the interfacing part of the call handling program links, without dropping the call, to a further communication session control interface provided at the device for continuation of the communication session handled by the communication session handling part of the communication session handling program.

19. A computer program product comprising computer readable instructions embodied on a computer readable storage memory at a device for handling a communication session at the device, the instructions comprising instructions for:
    executing a communication session handling program at the device, the communication session handling program comprising a communication session handling part for handling the communication session and an interfacing part for linking with a communication session control interface; and executing an application at the device, the application providing, to a user of the device, a communication session control interface for the communication session handled by the communication session handling part of the communication session handling program, the application linking with the interfacing part of the communication session handling program;

detecting that the application has ceased to provide the communication session control interface; and on detecting that the application has ceased to provide the communication session control interface, linking the interfacing part of the communication session handling program, without dropping the communication session, to a further communication session control interface provided at the device for continuation of the communication session handled by the communication session handling part of the communication session handling program.

* * * * *